United States Patent
Gu et al.

(10) Patent No.: US 11,033,881 B2
(45) Date of Patent: Jun. 15, 2021

(54) METHOD FOR IMPROVING PEROXIDASE-LIKE ACTIVITY OF NANOZYME AND PRODUCT THEREOF

(71) Applicant: University of Electronic Science and Technology of China, Sichuan (CN)

(72) Inventors: Deen Gu, Sichuan (CN); Yonghai Ma, Sichuan (CN); Yadong Jiang, Sichuan (CN); Licheng Lin, Sichuan (CN)

(73) Assignee: UNIVERSITY of Electronic Science and Technology of China, Sichuan (CN)

(*) Notice: Subject to any disclaimer, the term of this patent is extended or adjusted under 35 U.S.C. 154(b) by 42 days.

(21) Appl. No.: 16/673,969

(22) Filed: Nov. 5, 2019

(65) Prior Publication Data
US 2020/0078766 A1 Mar. 12, 2020

(30) Foreign Application Priority Data
Aug. 2, 2019 (CN) .......................... 201910711513.6

(51) Int. Cl.
*B01J 23/22* (2006.01)
*B01J 37/00* (2006.01)
*B01J 37/34* (2006.01)

(52) U.S. Cl.
CPC ............. *B01J 23/22* (2013.01); *B01J 37/009* (2013.01); *B01J 37/343* (2013.01)

(58) Field of Classification Search
CPC ......... B01J 23/22; B01J 37/009; B01J 37/343
See application file for complete search history.

(56) References Cited

PUBLICATIONS

Machine translation of Chen etal (CN 102181640) published Sep. 14, 2011.*
Derwent summary of Chen etal (CN 102181640) published Sep. 14, 2011.*

* cited by examiner

*Primary Examiner* — Brian A McCaig

(57) ABSTRACT

A method for improving peroxidase-like activity of nanozyme and a product thereof are disclosed, which relate to the field of artificial enzymes in biochemistry. The method adopts a hydrogen peroxide solution with high concentration to treat the $VO_2(B)$ powder for obtaining a product with high peroxidase-like activity. Compared with the pure $VO_2(B)$ powder, the peroxidase-like activity of the product obtained by the method is increased by 4 to 12 times. The method provided by the present invention adopts raw materials with low cost and mild reaction conditions, is simple in operation and low in cost, which is conducive to batch preparation. The powder product obtained by the method is able to be applied to detect hydrogen peroxide, glucose, etc., and has great application prospects in biosensing, industrial wastewater treatment and sewage treatment.

20 Claims, 1 Drawing Sheet

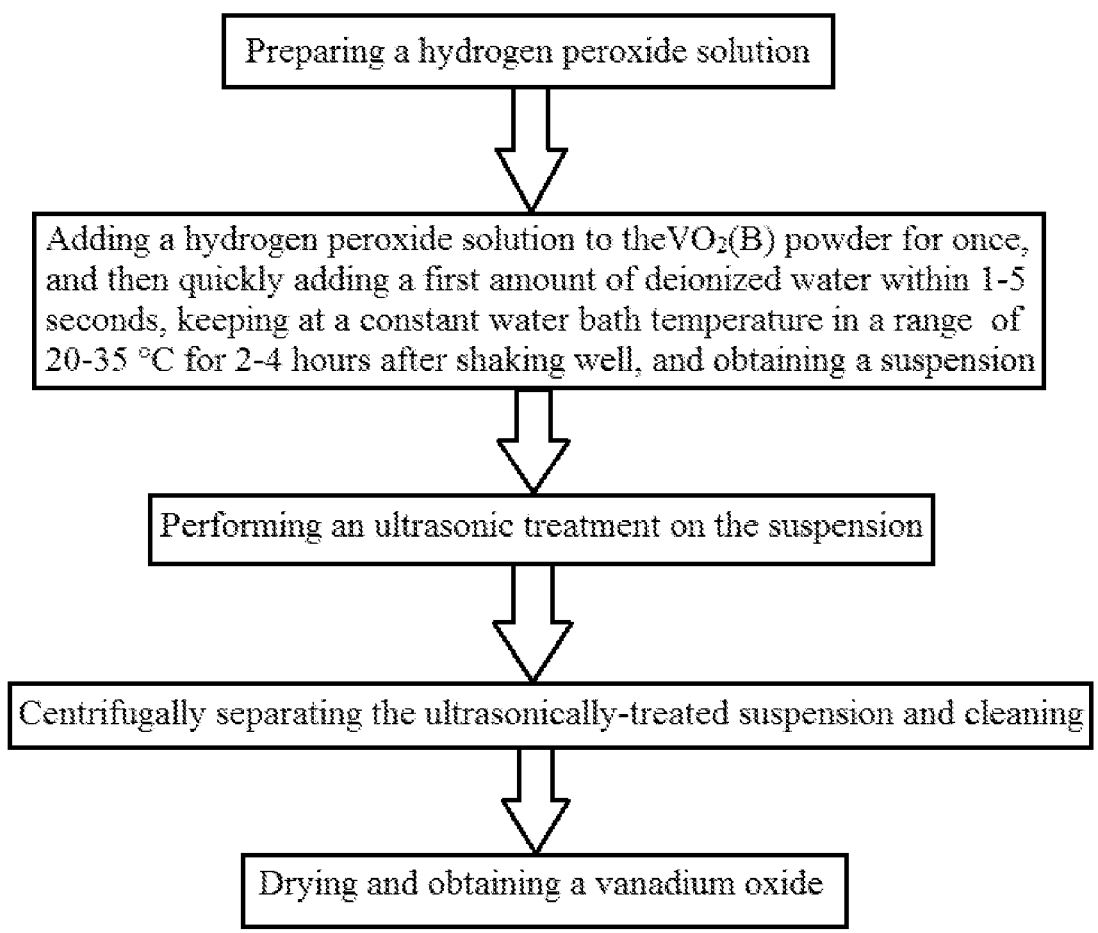

METHOD FOR IMPROVING PEROXIDASE-LIKE ACTIVITY OF NANOZYME AND PRODUCT THEREOF

CROSS REFERENCE OF RELATED APPLICATION

The present invention claims priority under 35 U.S.C. 119(a-d) to CN 201910711513.6, filed Aug. 2, 2019.

BACKGROUND OF THE PRESENT INVENTION

Field of Invention

The present invention relates to the field of artificial enzymes in biochemistry, and more particularly to a method for improving peroxidase-like activity of nanozyme and a product thereof, and the product relates to a vanadium oxide with high peroxidase-like activity.

Description of Related Arts

Natural enzymes are easily inactivated in harsh environments and in the presence of proteases, and have high manufacturing cost and harsh storage conditions, which limits their wide application. Therefore, the preparation of mimic enzymes with strong environmental adaptability has become one of the research fields concerned by researchers. In recent years, researches on biochemical applications of nanomaterials have attracted wide attention. Since the ferroferric oxide nanoparticles were found to have peroxidase-like activity in 2007, nanomaterials with peroxidase-like activity have attracted wide attention. Many nanoparticles with peroxidase-like activity have been discovered, including ferromagnetic nanoparticles with peroxidase-like activity, metal nanoparticles with peroxidase-like and oxidase-like activities, and cobalt tetraoxide nanoparticles with peroxidase-like and catalase-like activities. With the continuous research on the activity and catalytic mechanism of nanomaterials, it is found that the activity of nanoparticle peroxidase-like nanoparticles is not only related to the particle size of nanoparticles, but also to the surface charge, exposed lattice plane and loaded substance.

Among oxide nanozymes, vanadium oxide nanozymes have attracted attention in recent years. Recent studies have shown that $V_2O_5$ nanowires are able to catalyze the decomposition of hydrogen peroxide for oxidizing peroxidase substrates such as ABTS and TMB. The $V_2O_5$ nanowires have catalytic kinetic behaviors similar to vanadium haloperoxidase (V—HPO). Due to the peroxidase-like ability, the $V_2O_5$ nanowires have excellent potential for inhibiting marine biofouling, and have strong antibacterial properties against Gram-negative bacteria and Gram-positive bacteria. In addition to the $V_2O_5$ nanowires, A-type $VO_2$ ($VO_2$ (A)) and B-type $VO_2$ ($VO_2$ (B)) also have strong peroxidase-like activity and are able to be used for colorimetric detection of $H_2O_2$ and glucose.

Although several nanozymes such as $Fe_3O_4$ nanoparticles, $V_2O_5$ nanowires, $VO_2$ (A) and $VO_2$ (B), and noble metal nanoparticles have been reported, the catalytic activity of the reported nanozymes is much lower than that of typical biological enzymes. For example, as a typical representative of nanozymes, the catalytic activity of $Fe_3O_4$ nanoparticles is only one-fiftieth of that of the typical biological enzyme, namely, horseradish peroxidase (HPR) (B. Jiang, et al., Nature Protocols, 2018, 13, 1506-1520)), which limits the practical application of nanozymes to some extent. Therefore, it has great significance to develop a method which is simple in operation and low in cost, and is able to significantly improve the peroxidase-like activity of the nanozymes, so as to promote the technical progress and practical application of the nanozymes.

SUMMARY OF THE PRESENT INVENTION

A technical problem of the present invention to be solved is to provide a method for improving peroxidase-like activity of nanozyme and a product thereof, wherein the nanozyme is $VO_2(B)$ powder, the product is a vanadium oxide with high peroxidase-like activity, the method is simple in operation and low in cost, and is able to significantly improve the activity of the $VO_2(B)$ nanozyme and promote the technical progress and practical application of the nanozyme.

To solve the above technical problem, the present invention adopts a technical solution as follows.

A method for improving peroxidase-like activity of nanozyme is disclosed, wherein the nanozyme is $VO_2(B)$ powder and the method comprises steps of:

(S1) adding a certain amount of hydrogen peroxide solution with a high concentration to a certain amount of $VO_2(B)$ powder for once, and then quickly adding a certain amount of deionized water within 1-5 seconds, keeping at a constant water bath temperature in a range of 20-35° C. for 2-4 hours after shaking well, and obtaining a suspension;

(S2) performing an ultrasonic treatment on the suspension obtained by the step of (S1); and (S3) centrifugally separating the ultrasonically-treated suspension at a high speed, cleaning, drying, and obtaining a vanadium oxide.

Further, in the step of (S1), mass percentages of the added $VO_2(B)$ powder and the hydrogen peroxide solution are in a range of 1% to 6% and 2% to 16%, respectively; the rest is the deionized water.

The mass percentage in the technical solution of the present invention refers to the mass percentage of each component relative to the total mass of the suspension.

Further, in the step of (S1), the hydrogen peroxide solution has a concentration in a range of 1 to 1.5 mol/L.

Further, the hydrogen peroxide solution with the concentration in the range of 1 to 1.5 mol/L is prepared by adding an appropriate amount of deionized water to hydrogen peroxide with a mass fraction in a range of 27% to 35%, so as to obtain the hydrogen peroxide solution with the concentration in the range of 1 to 1.5 mol/L.

After being processed at the constant water bath temperature, reaction conditions are milder.

Further, in the step of (S2), the ultrasonic treatment is performed for 10 to 20 minutes.

Further, in the step of (S3), the suspension after the ultrasonic treatment is centrifugally separated at a rotational speed in a range of 8000 to 12000 rpm for 5 to 10 minutes.

Further, in the step of (S3), the suspension after being centrifugally separated is dried at 20-60° C. for 16-24 hours.

Also, the present invention provides a vanadium oxide powder with high peroxidase-like activity which is obtained by the above method for improving peroxidase-like activity of the $VO_2(B)$ powder, wherein an atomic ratio of oxygen to vanadium on a surface of the vanadium oxide powder with high peroxidase-like activity is in range of 2.65 to 3.00.

The present invention has beneficial effects as follows.

1. High activity: Compared with the pure $VO_2(B)$ powder without hydrogen peroxide treatment, the obtained powder after hydrogen peroxide treatment provided by the present invention is specifically a vanadium oxide powder whose catalytic activity of peroxidase-like is increased by 4 to 12 times.

2. Low cost: The method provided by the present invention adopts the $VO_2(B)$ powder, hydrogen peroxide and deionized water as raw materials, which are low in cost and easy to be prepared.

3. The reaction conditions are mild and the operation is simple, which is beneficial to practical applications. The method and reaction provided by the present invention are all carried out at room temperature, which is safe and simple.

4. The obtained powder product of the present invention is specifically a vanadium oxide which is able to be applied to detect hydrogen peroxide, glucose, etc., and simultaneously, has great application prospects in biosensing, industrial wastewater treatment and sewage treatment.

BRIEF DESCRIPTION OF THE DRAWINGS

In order to more clearly illustrate the technical solutions of the embodiments of the present invention, the drawing used in the embodiments will be briefly described as below. It is obvious that the drawing in the following description is only a part of the present invention; for those skilled in the art, other drawings are able to be obtained according to the drawing provided by the present invention without any creative work.

The drawing is a total flow diagram of a method for improving the peroxidase-like activity of nanozyme.

DETAILED DESCRIPTION OF THE PREFERRED EMBODIMENT

In order to better explain the present invention, the present invention is further described by embodiments as follows. It should be understood that the embodiments are only intended to describe the present invention more directly, which are only a part of the present invention and are not intended to limit the present invention.

First Embodiment

Referring to the drawing, adding 9 ml of deionized water to 1 ml of hydrogen peroxide with a mass fraction of 30%, obtaining a hydrogen peroxide solution with a concentration of 1 mol/L; adding 60 μl of the hydrogen peroxide solution with the concentration of 1 mol/L to 10 mg of $VO_2(B)$ powder for once, and then quickly adding 10 ml of deionized water within 1 second, performing water bath at 20° C. for 2 hours after shaking well, obtaining a suspension, performing an ultrasonic treatment on the suspension for 10 minutes, and then centrifugally separating at a rotational speed of 8000 rpm for 5 minutes, cleaning a product after the centrifugal separation, drying a cleaned product at 20° C. for 16 hours, and finally obtaining a vanadium oxide (which is recorded as VO-1).

Second Embodiment

Referring to the drawing, adding 8.67 ml of deionized water to 1.33 ml of hydrogen peroxide with a mass fraction of 27%, obtaining a hydrogen peroxide solution with a concentration of 1.2 mol/L; adding 100 μl of the hydrogen peroxide solution with the concentration of 1.2 mol/L to 10 mg of $VO_2(B)$ powder for once, and then quickly adding 10 ml of deionized water within 3 seconds, performing water bath at 25° C. for 3 hours after shaking well, obtaining a suspension, performing an ultrasonic treatment on the suspension for 15 minutes, and then centrifugally separating at a rotational speed of 9000 rpm for 8 minutes, cleaning a product after the centrifugal separation, drying a cleaned product at 40° C. for 18 hours, and finally obtaining a vanadium oxide (which is recorded as VO-2).

Third Embodiment

Referring to the drawing, adding 8.71 ml of deionized water to 1.29 ml of hydrogen peroxide with a mass fraction of 35%, obtaining a hydrogen peroxide solution with a concentration of 1.5 mol/L; adding 120 μl of the hydrogen peroxide solution with the concentration of 1.5 mol/L to 10 mg of $VO_2(B)$ powder for once, and then quickly adding 10 ml of deionized water within 5 seconds, performing water bath at 35° C. for 4 hours after shaking well, obtaining a suspension, performing an ultrasonic treatment on the suspension for 20 minutes, and then centrifugally separating at a rotational speed of 12000 rpm for 10 minutes, cleaning a product after the centrifugal separation, drying a cleaned product at 60° C. for 24 hours, and finally obtaining a vanadium oxide (which is recorded as VO-3).

Fourth Embodiment

Referring to the drawing, adding 9 ml of deionized water to 1 ml of hydrogen peroxide with a mass fraction of 30%, obtaining a hydrogen peroxide solution with a concentration of 1 mol/L; adding 240 μl of the hydrogen peroxide solution with the concentration of 1 mol/L to 10 mg of $VO_2(B)$ powder for once, and then quickly adding 10 ml of deionized water within 1 second, performing water bath at 25° C. for 2 hours after shaking well, obtaining a suspension, performing an ultrasonic treatment on the suspension for 15 minutes, and then centrifugally separating at a rotational speed of 8000 rpm for 10 minutes, cleaning a product after the centrifugal separation, drying a cleaned product at 60° C. for 24 hours, and finally obtaining a vanadium oxide (which is recorded as VO-4).

Fifth Embodiment

Referring to the drawing, adding 8.71 ml of deionized water to 1.29 ml of hydrogen peroxide with a mass fraction of 35%, obtaining a hydrogen peroxide solution with a concentration of 1.5 mol/L; adding 300 μl of the hydrogen peroxide solution with the concentration of 1.5 mol/L to 15 mg of $VO_2(B)$ powder for once, and then quickly adding 10 ml of deionized water within 1 second, performing water bath at 20° C. for 3 hours after shaking well, obtaining a suspension, performing an ultrasonic treatment on the suspension for 15 minutes, and then centrifugally separating at a rotational speed of 9000 rpm for 5 minutes, cleaning a product after the centrifugal separation, drying a cleaned product at 60° C. for 24 hours, and finally obtaining a vanadium oxide (which is recorded as VO-5).

First Comparative Example (which is Different from the First Embodiment in that the Hydrogen Peroxide Solution is Added for Several Times)

Adding 9 ml of deionized water to 1 ml of hydrogen peroxide with a mass fraction of 30%, obtaining a hydrogen peroxide solution with a concentration of 1 mol/L; firstly adding 30 μl of the hydrogen peroxide solution with the concentration of 1 mol/L to 10 mg of VO$_2$(B) powder, secondly adding 30 μl of the hydrogen peroxide solution with the concentration of 1 mol/L after 2 minutes, and then quickly adding 10 ml of deionized water within 1 second, performing water bath at 20° C. for 2 hours after shaking well, obtaining a suspension, performing an ultrasonic treatment on the suspension for 10 minutes, and then centrifugally separating at a rotational speed of 8000 rpm for 5 minutes, cleaning a product after the centrifugal separation, drying a cleaned product at 20° C. for 16 hours, and finally obtaining a vanadium oxide (which is recorded as VO-6).

Second Comparative Example (which is Different from the Third Embodiment in that the Deionized Water is Added Drop by Drop)

Adding 8.71 ml of deionized water to 1.29 ml of hydrogen peroxide with a mass fraction of 35%, obtaining a hydrogen peroxide solution with a concentration of 1.5 mol/L; adding 120 μl of the hydrogen peroxide solution with the concentration of 1.5 mol/L to 10 mg of VO$_2$(B) powder for once, and then adding 10 ml of deionized water drop by drop, performing water bath at 35° C. for 4 hours after shaking well, obtaining a suspension, performing an ultrasonic treatment on the suspension for 20 minutes, and then centrifugally separating at a rotational speed of 12000 rpm for 10 minutes, cleaning a product after the centrifugal separation, drying a cleaned product at 60° C. for 24 hours, and finally obtaining a vanadium oxide (which is recorded as VO-7).

Enzyme activity test analysis and surface composition change analysis of the product prepared in each embodiment and each comparative example are as follows.

(I) Enzyme Activity Test Analysis of the Product

The pure VO$_2$(B) powder without hydrogen peroxide treatment is taken as a comparative sample which is recorded as VO-R.

Performing the peroxidase-like activity test on the products VO-1, VO-2, VO-3, VO-4, VO-5, VO-6 and VO-7 respectively prepared in the first, second, third, fourth and fifth embodiments and the first and second comparative examples, and the comparative sample VO-R.

The test method is: in a weakly acidic environment, the rate, that the tested products catalyze hydrogen peroxide for oxidizing 3,3',5,5'-tetramethylbenzidine to produce a blue dehydrogenation product, is tested; the rate is based on the amount of change in the absorbance value of the products at the wavelength of 650 nm for the first 5 seconds.

and then, according to a formula of $b_{nanozyme}=V/(\varepsilon \times l) \times (\Delta A/\Delta t)$, the nanozyme activity $b_{nanozyme}$ is obtained, wherein V refers to volume of the reaction solution while testing (μl), ε refers to molar absorption coefficient (M$^{-1}$cm$^{-1}$), a molar absorption coefficient of TMB is 39000 M$^{-1}$cm$^{-1}$, l refers to path length of light propagation in a cuvette (cm), ($\Delta A/\Delta t$) refers to initial rate of change in absorbance.

The test results are shown in Table 1 as below.

TABLE 1

Measured enzyme activity data of the products prepared in each embodiment and each comparative example and the comparative sample at 37° C. and pH = 4.0

| Product | Reaction temperature (° C.) | PH | enzyme activity (units) | Increased by (times) |
| --- | --- | --- | --- | --- |
| VO-R | 37 | 4.0 | 0.0196 | — |
| VO-1 | 37 | 4.0 | 0.0907 | 3.628 |

TABLE 1-continued

Measured enzyme activity data of the products prepared in each embodiment and each comparative example and the comparative sample at 37° C. and pH = 4.0

| Product | Reaction temperature (° C.) | PH | enzyme activity (units) | Increased by (times) |
| --- | --- | --- | --- | --- |
| VO-2 | 37 | 4.0 | 0.2520 | 11.86 |
| VO-3 | 37 | 4.0 | 0.1799 | 8.18 |
| VO-4 | 37 | 4.0 | 0.1742 | 7.89 |
| VO-5 | 37 | 4.0 | 0.0988 | 4.04 |
| VO-6 | 37 | 4.0 | 0.0185 | — |
| VO-7 | 37 | 4.0 | 0.0176 | — |

The experimental result data of Table 1 indicate that:

(1) Compared with the pure VO$_2$(B) (recorded as VO-R) without hydrogen peroxide treatment, the peroxidase-like activity of the obtained vanadium oxide (recorded as VO-1) after hydrogen peroxide solution treatment according to the first embodiment is increased by 3.628 times.

(2) Compared with the pure VO$_2$(B) (recorded as VO-R) without hydrogen peroxide treatment, the peroxidase-like activity of the obtained vanadium oxide (recorded as VO-2) after hydrogen peroxide solution treatment according to the second embodiment is increased by 11.86 times.

(3) Compared with the pure VO$_2$(B)(recorded as VO-R) without hydrogen peroxide treatment, the peroxidase-like activity of the obtained vanadium oxide (recorded as VO-3) after hydrogen peroxide solution treatment according to the third embodiment is increased by 8.18 times.

(4) Compared with the pure VO$_2$(B) (recorded as VO-R) without hydrogen peroxide treatment, the peroxidase-like activity of the obtained vanadium oxide (recorded as VO-4) after hydrogen peroxide solution treatment according to the fourth embodiment is increased by 7.89 times.

(5) Compared with the pure VO$_2$(B) (recorded as VO-R) without hydrogen peroxide treatment, the peroxidase-like activity of the obtained vanadium oxide (recorded as VO-5) after hydrogen peroxide solution treatment according to the fifth embodiment is increased by 4.04 times.

(6) Compared with the pure VO$_2$(B) (recorded as VO-R) without hydrogen peroxide treatment, the peroxidase-like activity of the obtained vanadium oxide (recorded as VO-6) after hydrogen peroxide solution treatment for twice according to the first comparative example is not increased.

(7) Compared with the pure VO$_2$(B) (recorded as VO-R) without hydrogen peroxide treatment, the peroxidase-like activity of the obtained vanadium oxide (recorded as VO-7) after hydrogen peroxide solution treatment for once followed by adding 10 ml of deionized waterdrop by drop according to the second comparative example is also not increased.

In summary, the treatment of VO$_2$(B) powder with the hydrogen peroxide solution with the high concentration in the range of 1-1.5 mol/L is a method to effectively improve the peroxidase-like activity of the VO$_2$(B) nanozyme.

In the method, the addition mode of the hydrogen peroxide solution and the addition time of the deionized water have a key influence on the peroxidase-like activity of the product obtained by the method, and the hydrogen peroxide solution needs to be added for once, and the desired amount of deionized water needs to be quickly added within 1 to 5 seconds to dilute the solution.

(II) Surface Composition Change Analysis of the Product

Performing the surface XPS analysis on the products VO-1, VO-2, VO-3, VO-4, VO-5, VO-6 and VO-7 respectively prepared in the first, second, third, fourth and fifth embodiments and the first and second comparative examples, and the comparative sample VO-R.

The test method is that an X-ray photoelectron spectroscopy (XPS) is used to analyze the element content of the products to obtain the atomic ratio of oxygen to vanadium on the surface of the products.

The test results are shown in Table 2 as below.

TABLE 2

Data of the atomic ratio of oxygen to vanadium on the surface of the products prepared in all embodiments and all comparative examples

| Product | Atomic ratio of oxygen to vanadium |
|---|---|
| VO-R | 2.55 |
| VO-1 | 2.79 |
| VO-2 | 2.96 |
| VO-3 | 2.92 |
| VO-4 | 2.87 |
| VO-5 | 2.86 |
| VO-6 | 2.54 |
| VO-7 | 2.50 |

The experimental result data of Table 2 indicate that:

(1) Compared with the pure $VO_2(B)$ (recorded as VO-R) without hydrogen peroxide treatment, the atomic ratio of oxygen to vanadium on the surface of the obtained vanadium oxides (recorded as VO-1, VO-2, VO-3, VO-4 and VO-5) after hydrogen peroxide solution treatment according to the first, second, third, fourth and fifth embodiments is increased.

(2) Compared with the pure $VO_2(B)$ (recorded as VO-R) without hydrogen peroxide treatment, the atomic ratio of oxygen to vanadium on the surface of the obtained vanadium oxide (recorded as VO-6) after hydrogen peroxide solution treatment for twice according to the first comparative example, and the atomic ratio of oxygen to vanadium on the surface of the obtained vanadium oxide (recorded as VO-7) after hydrogen peroxide solution treatment for once followed by adding 10 ml of deionized water drop by drop according to the second comparative example are slightly decreased.

In summary, the treatment of $VO_2(B)$ powder by a one-time addition of the hydrogen peroxide solution with the concentration in the range of 1 to 1.5 mol/L increases the atomic ratio of oxygen to vanadium on the surface of the product (namely, vanadium oxide); the atomic ratio of oxygen to vanadium on the surface of the vanadium oxide with the high peroxidase-like activity is in the range of 2.65 to 3.00.

The activity of the vanadium oxide whose atomic ratio of oxygen to vanadium on the surface thereof is increased has a higher level of improvement according to the first, second, third, fourth and fifth embodiments. Due to higher peroxidase-like activity than the pure $VO_2(B)$ powder, the product obtained through the method provided by the present invention is able to be applied to detect hydrogen peroxide, glucose, etc., and has great application prospects in biosensing, industrial wastewater treatment and sewage treatment.

The above are specific embodiments of the present invention, but are not intended to limit the present invention. Therefore, it should be noted that any modifications and improvements made on the basis of the present invention fall within the protective scope of the present invention.

What is claimed is:

1. A method for improving peroxidase-like activity of nanozyme, wherein the nanozyme is $VO_2(B)$ powder and the method comprises steps of:
   (S1) adding a hydrogen peroxide solution to the $VO_2(B)$ powder, and then quickly adding a first amount of deionized water within 1-5 second, shaking to obtain a suspension, and keeping at a constant water bath temperature in a range of 20-35° C. for 2-4 hours after shaking;
   (S2) performing an ultrasonic treatment on the suspension obtained by the step of (S1); and
   (S3) centrifugally separating the ultrasonically-treated suspension, cleaning, drying, and obtaining a vanadium oxide.

2. The method, as recited in claim 1, wherein: in the step of (S1), mass percentages of the $VO_2(B)$ powder and the hydrogen peroxide solution are in a range of 1% to 6% and 2% to 16%, respectively; the rest is the first amount of deionized water.

3. The method, as recited in claim 2, wherein: in the step of (S1), a concentration of the hydrogen peroxide solution is in a range of 1 to 1.5 mol/L.

4. The method, as recited in claim 3, wherein: in the step of (S1), the hydrogen peroxide solution with the concentration in the range of 1 to 1.5 mol/L is prepared by adding a second amount of deionized water to hydrogen peroxide with a mass fraction in a range of 27% to 35%, so as to obtain the hydrogen peroxide solution with the concentration in the range of 1 to 1.5 mol/L.

5. The method, as recited in claim 4, wherein: in the step of (S2), the ultrasonic treatment is performed for 10 to 20 minutes.

6. The method, as recited in claim 5, wherein: in the step of (S3), the suspension after the ultrasonic treatment is centrifugally separated at a rotational speed in a range of 8000 to 12000 rpm for 5 to 10 minutes.

7. The method, as recited in claim 6, wherein: in the step of (S3), the suspension after being centrifugally separated is dried at 20-60° C. for 16-24 hours.

8. The method, as recited in claim 2, wherein: in the step of (S2), the ultrasonic treatment is performed for 10 to 20 minutes.

9. The method, as recited in claim 3, wherein: in the step of (S3), the suspension after the ultrasonic treatment is centrifugally separated at a rotational speed in a range of 8000 to 12000 rpm for 5 to 10 minutes.

10. The method, as recited in claim 3, wherein: in the step of (S3), the suspension after being centrifugally separated is dried at 20-60° C. for 16-24 hours.

11. The method, as recited in claim 1, wherein: in the step of (S1), a concentration of the hydrogen peroxide solution is in a range of 1 to 1.5 mol/L.

12. The method, as recited in claim 11, wherein: in the step of (S1), the hydrogen peroxide solution with the concentration in the range of 1 to 1.5 mol/L is prepared by adding a second amount of deionized water to hydrogen peroxide with a mass fraction in a range of 27% to 35%, so as to obtain the hydrogen peroxide solution with the concentration in the range of 1 to 1.5 mol/L.

13. The method, as recited in claim 12, wherein: in the step of (S2), the ultrasonic treatment is performed for 10 to 20 minutes.

14. The method, as recited in claim 13, wherein: in the step of (S3), the suspension after the ultrasonic treatment is centrifugally separated at a rotational speed in a range of 8000 to 12000 rpm for 5 to 10 minutes.

15. The method, as recited in claim 14, wherein: in the step of (S3), the suspension after being centrifugally separated is dried at 20-60° C. for 16-24 hours.

16. The method, as recited in claim 11, wherein: in the step of (S3), the suspension after being centrifugally separated is dried at 20-60° C. for 16-24 hours.

17. The method, as recited in claim 1, wherein: in the step of (S2), the ultrasonic treatment is performed for 10 to 20 minutes.

18. The method, as recited in claim 1, wherein: in the step of (S3), the suspension after the ultrasonic treatment is centrifugally separated at a rotational speed in a range of 8000 to 12000 rpm for 5 to 10 minutes.

19. The method, as recited in claim 1, wherein: in the step of (S3), the suspension after being centrifugally separated is dried at 20-60° C. for 16-24 hours.

20. A vanadium oxide powder which is obtained by the method as recited in claim 1, wherein: an atomic ratio of oxygen to vanadium on a surface of the vanadium oxide powder is in a range of 2.65 to 3.00.

\* \* \* \* \*